US006637801B1

(12) United States Patent
Eustache et al.

(10) Patent No.: US 6,637,801 B1
(45) Date of Patent: Oct. 28, 2003

(54) MOTOR VEHICLE REAR TRANSVERSE PART AND EQUIPMENT MODULE FOR SAME

(75) Inventors: Jean-Pierre Eustache, Antony (FR); Laurent Simon, Montigny le Bretonneux (FR); Vincent Izabel, Brunoy (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 10/048,376

(22) PCT Filed: Jul. 28, 2000

(86) PCT No.: PCT/FR00/02179

§ 371 (c)(1),
(2), (4) Date: Jan. 28, 2002

(87) PCT Pub. No.: WO01/08945

PCT Pub. Date: Feb. 8, 2001

(30) Foreign Application Priority Data

Jul. 30, 1999 (FR) .............................................. 99 09896

(51) Int. Cl.[7] .............................................. B62D 25/06
(52) U.S. Cl. ...................... 296/106; 296/146.8; 296/56; 296/197
(58) Field of Search ............................ 296/146.1, 152, 296/146.8, 56, 106, 196, 197

(56) References Cited

U.S. PATENT DOCUMENTS

| 5,295,374 | A | * | 3/1994 | Bender et al. |
| 5,847,519 | A | * | 12/1998 | Kilker |
| 6,019,418 | A | * | 2/2000 | Emerling et al. |
| 6,053,562 | A | * | 4/2000 | Bednarski |

FOREIGN PATENT DOCUMENTS

| DE | 195 01 210 | 7/1996 |
| EP | 0 652 142 | 5/1995 |
| EP | 0 964 452 | 1/1996 |
| WO | 96 33893 | 1/1996 |

* cited by examiner

Primary Examiner—D. Glenn Dayoan
Assistant Examiner—Scott Carpenter
(74) Attorney, Agent, or Firm—J. Gordon Lewis

(57) ABSTRACT

A motor vehicle rear transverse part includes a generally vertically oriented element defining a frame closed by a rear window and an internal support structure and an external fitting panel and also including an equipment module directly mounted on the element and a wiper system for the rear window and a flashing light. The equipment module is received in a housing matching the element wherein it is mounted from outside.

24 Claims, 7 Drawing Sheets

MOTOR VEHICLE REAR TRANSVERSE PART AND EQUIPMENT MODULE FOR SAME

BACKGROUND

This invention concerns a motor vehicle rear transverse part equipped with an equipment module.

The invention concerns, more specifically, a motor vehicle rear transverse part comprising a generally vertically oriented element defining a frame closed by a rear window, comprising an internal support structure and an external fitting panel in particular an external body skin, and comprising an equipment module directly mounted on the element and comprising, in particular, a wiper system for the rear window and a flashing light.

According to a conception currently used in automobile production, and, in particular, in certain vehicles, the vehicle rear transverse part is made up of an opening element, specifically a hatchback, which is articulatingly mounted in relation to the body of the vehicle, more generally around a larger articulation horizontal axis, or around a vertical lateral axis.

Numerous accessories can be attached onto the motor vehicle rear door, in particular, when it is a large rear hatchback.

Thus, the hatchback can support, in addition to its latching and window system, an electric wiper motor, a license plate, and taillight systems, but also eventually the third obligatory brake light, seen even when all of part of the rear taillights are blocked, as well as the rear window which is, where appropriate, also articulated in relation to the hatchback.

All the accessories, which are certainly products independent of the body piece that makes up the hatchback, must thus be mounted on the hatchback outside of vehicle production.

And yet, the multiplication of accessories leads to an increase in the mounting time and leads to multiple risks of mounting defects.

However, it is necessary to foresee, for each of the electric accessories, an electric power supply part, means of controlling these accessories, and also surveillance means that allow, in particular, information about the state of the functioning of the accessories by either the driver, for example, via warning lights on the dashboard, or by a central electronic management unit of the vehicle.

In order to simplify and make reliable the different mounting and assembly operations, numerous conceptions calling for an equipment module directly mounted on the rear element, in particular, on an opening in the form of a hatchback, have already been proposed.

In all the known conceptions, the equipment module, or an equivalent subset comprising a support plate of different equipment and accessories, is in the shape of a relatively bulky subset that is mounted on the vehicle rear element while the interior of vehicle calls for different attachment means that make the mounting and attachment operations long and complex. According to these known conceptions, it is more specifically difficult to mount the equipment module when the rear element is a fixed element belonging to the vehicle body, or to mount the equipment module on the interior of the hatchback when it is already mounted articulated on the vehicle body.

SUMMARY

In order to remedy these inconveniences, this invention proposes a motor vehicle rear transverse part characterized by the equipment module being received in a housing matching the element in which it is mounted from the exterior.

According to other characteristics of the invention:

the equipment module comprises an external body with a shape and profile complementary to that of the housing that receives it and which, in a mounted position, makes up a part attached to the exterior fitting panel;

the external body of the equipment module is a molded plastic material piece;

the external body of the equipment module bears fixing elements of the equipment module comprising the attachment rods that extend parallel to the direction of the mounting of the equipment module;

the equipment module comprises an internal plate that bears, in particular, the wiping system;

the internal plate comprises two parts, joined together via elastic absorption means, of which a first part bears the equipment and the second part is linked to the external body of the equipment module;

the second part of the plate comprises means for attaching the equipment module onto the element;

the second part of the plate bears at least one equipment, in particular, a locking mechanism designed to cooperate with a mobile opening mounted in relation to the element;

the second part of the plate is a generally transversal and horizontal;

the first part of the plate bears the wiping system;

the equipment module is attached below the window frame;

the equipment module comprises a rear window;

the equipment module comprises a frame closed by the rear window;

the rear window is articulatingly mounted onto the equipment module;

the equipment module comprises at least one rear light, in particular, a brake light, turn signal, reverse, fog lights, or lighting the license plate;

the equipment module comprises at least one interior lighting device for the vehicle interior and/or the trunk;

the equipment module comprises positioning means in a resting position of a wiper arm of the wiper system;

the equipment module comprises protection means, in a resting position, of a wiper arm of the wiper system;

the equipment module comprises means forming a handle;

the positioning and/or protection and/or handle forming means are created from a material via molding with the external body of the equipment module;

the equipment module comprises control means, operable from the interior, for opening the element while it is a vehicle door;

there are reinforcement means for the fixation of the equipment module on the element, in particular, in order to improve its resistance to wrenching from the exterior of the vehicle;

the mounting direction of the equipment module is notably perpendicular to the general vertical plane of the element;

the element is a vehicle rear opening that is articulatingly mounted on the vehicle body, in particular, around a transversal axis higher than the vehicle;

The invention also proposes an equipment module for a rear part of the motor vehicle conforming to the specifications of the invention.

BRIEF DESCRIPTION OF THE DRAWING

Other characteristics and advantages of the invention will appear in the reading of the detailed description that will follow and for the comprehension of which one will look at the attached drawings in which.

DETAILED DESCRIPTION

Figure 1:
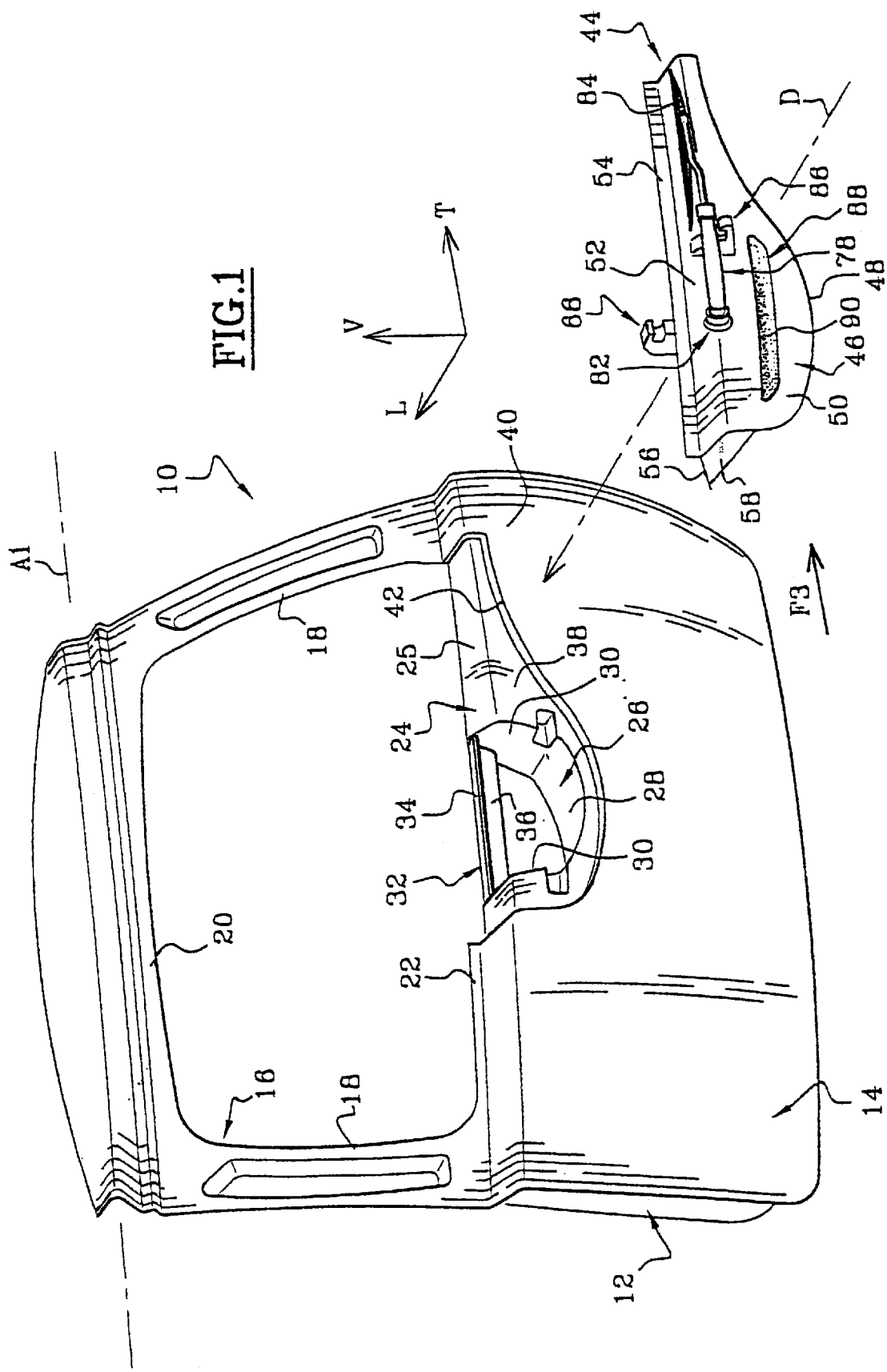
FIG. 1 is a schematic perspective, three-quarters rear view, which illustrates a first production example of,the invention and on which one has represented an exterior view of a rear vehicle hatchback with its equipment module in a mounting position.
Figure 2:
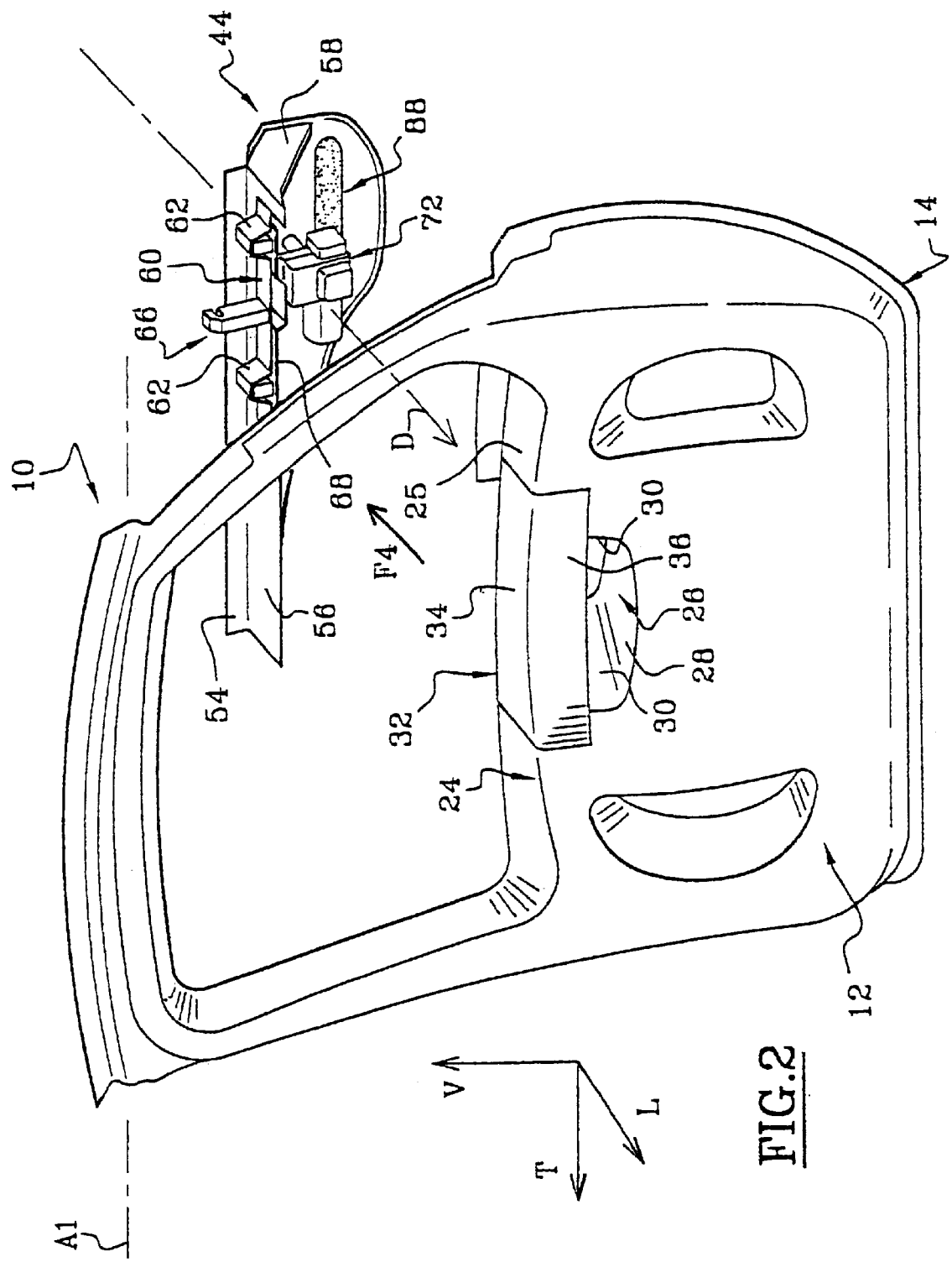
FIG. 2 is a view similar view to that in FIG. 1 on which an interior view of the rear hatchback with its equipment module in mounting position is represented.
Figure 3:
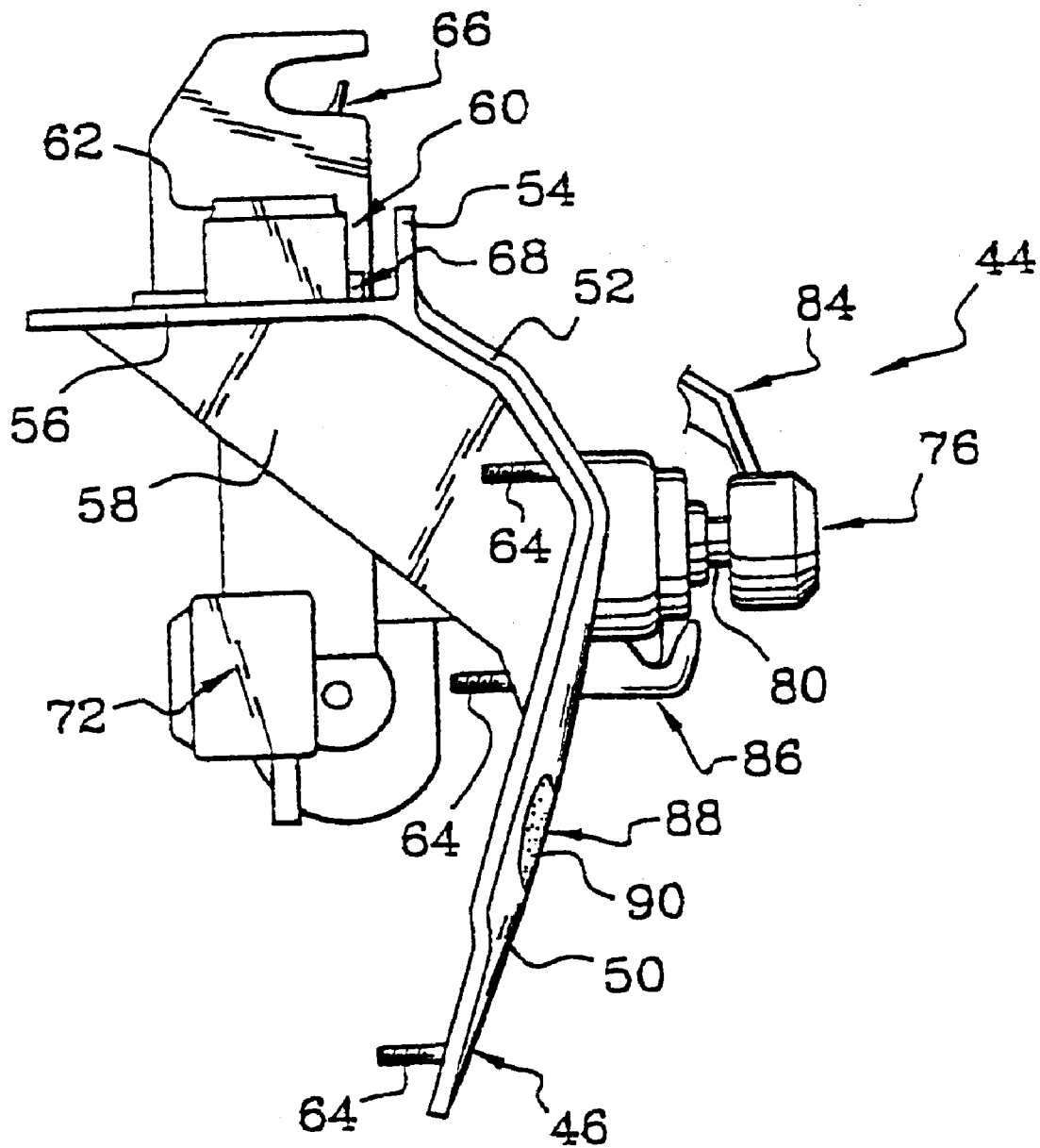
FIG. 3 is a lateral view at a larger scale, according to the arrow F3 from that represents the equipment module.
Figure 4:
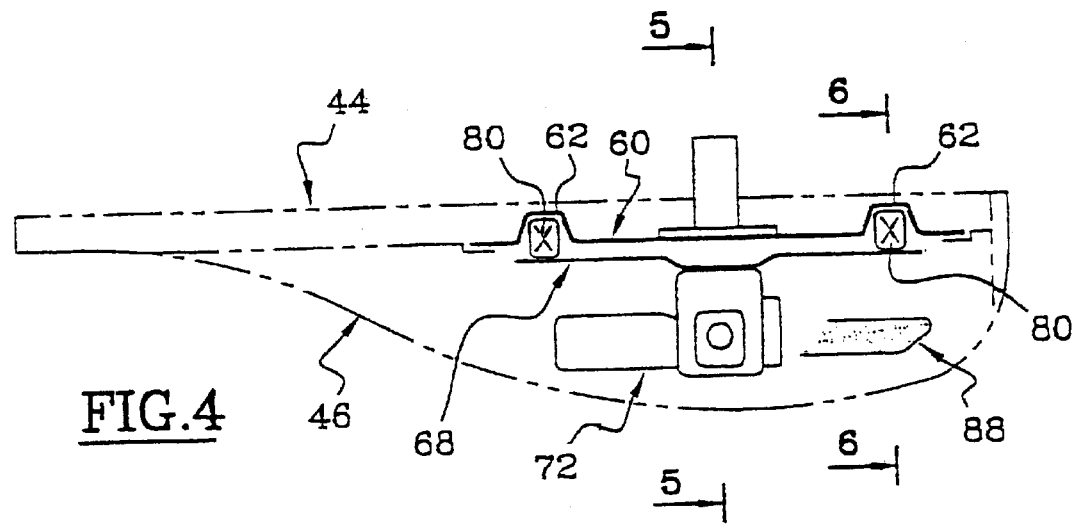
FIG. 4 is a schematic view of the equipment module according to the arrow F4 in FIG. 2.

In the description that will follow, on will use, in a non-limiting manner, the terms transversal, longitudinal, and vertical in reference to the three corresponding axis "T", "L" and "V", respectively, indicated in particular in FIGS. 1 and 2.

In the description, identical, analog or similar elements will be designated by the same reference numbers.

One has represented, particularly on FIGS. 1 and 2, an element 10 belonging to the rear transverse part of a motor vehicle, not represented in its entirety, which, in the production method represented in FIGS. 1 and 2, is a motor vehicle rear transverse hatchback.

According to a generally known conception, the hatchback 10 is conceived to be articulatingly mounted, for example around an upper transverse horizontal axis A1, in relation to a part complementary to the vehicle body.

According to this generally known concept, the hatchback forming rear element 10 is made up of an interior support structure 12, in bent and soldered, stamped sheet metal, and of an exterior fitting panel 14 that is, for example, an exterior body skin attached onto the support structure 12.

Thus created, the hatchback 10 comprises a full lower part and an open upper part making up a frame 16 designed to receive, in a known manner, a rear window (not represented) which can be a fixed rear window or a rear window articulated onto the hatchback.

To this effect, the frame 16 is particularly defined by two lateral vertical jambs 20, by an upper transverse horizontal jamb 18, and by a lower transverse horizontal jamb 22.

In the case where the frame 16 receives a fixed rear window, it is, for example, fixed by being glued onto the corresponding portions of the exterior surfaces of the jambs 18, 20, and 22.

As one can see in FIGS. 1 and 2, the interior support structure defines a horizontal body crosspiece 24 which is attached above the lower part of the hatchback 10, that is to say, under the lower horizontal jamb 22 of the frame 16 and in which a housing 26 is formed, defined by a curved bottom 28 and by two longitudinal lateral faces with a vertical orientation 30, the housing 26 being longitudinally blocked, more towards the front, that is to say, towards the interior of the passenger cabin, than towards the rear, that is to say, towards the exterior of the vehicle.

At its upper front end, the housing 26 comprises an upper transverse reinforcement bar 32 which is in the shape of an "L" shaped angle-section comprising a horizontal flank 34 and a vertical flank 36.

The lower part of the support structure 12 in which the housing 26 is constructed is longitudinally defined towards the rear via a rear transverse metal sheet 38 which extends in a vertical plane and which is fitted with a corresponding part 40 of the body skin 14 which comprises a cut 42 notably complementary to the profile of the housing 26 but situated at a distance from it in order to disengage a part of the exterior face of the upper horizontal transverse metal sheet 25 of the crosspieces 24.

In the case of a hatchback articulated around a horizontal axis, the vertical orientation of certain elements must be understood as corresponding to the closed position of the hatchback.

Considering FIG. 1, one sees that the hatchback 10 comprises a housing 26 which is globally open towards the rear, that is to say, towards the exterior of the hatchback 10, and in which can be put into place, conforming to the specifications of the invention, an equipment module 44.

The general profile and the exterior shape of the equipment module 44 are complementary to those of the housing 26 and the cut 42, and other environmental elements in order to allow the mounting of the equipment module 44 in the housing 26 of the hatchback 10, from the rear to the front, according to the mounting direction D indicated in FIGS. 1 and 2.

Conforming to the specifications of the invention, the mounting of the equipment module 44 takes place onto the hatchback from the exterior, that is to say, that such a mounting is particularly simple, and can take place on the rear part of the vehicle, particularly onto its hatchback 10, without having to access the interior of the passenger cabin.

One will now describe in more detail the conception of the equipment module 44, particularly in reference to FIGS. 3 to 6.

The equipment module 44 comprises first of all an external body 46 which is, for example, a molded plastic material piece in a complex shape.

The body 46 is the external piece of the module 44, generally in the shape of a plate, and is shaped in three dimensions, with its edge or external contour 48 which is complementary to the cut 42 in order to complete it while the module is in a mounted position, that is to say, that the external body 46 makes up a part matching the body skin 40 of the lower part of the hatchback 10.

Thus, the body 46 comprises a rear vertical plate 50 which is created to be adjacent to the metal sheet 38 and an upper transverse plate inclined towards the rear 52 in order to be adjacent to the upper metal sheet 25 of the crosspiece 24, the upper plate 52 projecting vertically towards the top via an edge 54 which completes the lower jamb 22 of the frame 16 in order to receive the window and/or a window seal.

Beyond the edge 54, the external body 46 also comprises a plate 56 which extends towards the interior, that is to say, towards the front, and is slightly inclined in relation to the horizontal, this plate 56 being joined to the plates 50 and 52 via two lateral vertical reinforcement side panels 58.

In the mounted position of the module 44 in its housing 26, the plate 56 extends under the upper flank 34 of the transverse reinforcement bar 32.

The plate 56 integrates a transverse beam 60 making up a rigid element, for example, metal, forming a part of a support plate of the equipment elements or components integrated onto the module 44.

The transverse beam 60 is directly attached onto the plate 56, or is partially embedded in it during the molding operation of the external body 46, and it comprises two raised lugs 62 each able to include, for example, an aperture permitting a complementary fixation of the module 44 under the flank 34 via means not represented, for example, by means of a screw-nut combination.

The other mounting and fixation means in a mounted position of the equipment module 44 onto the hatchback 10 are made up of a series of fixation rods 64 that belong to the external body 46 and which extend longitudinally towards the front according to a direction parallel to the mounting direction D in order to be received in the complementary mounting means, not represented in detail, carried via the metal sheet 38 from the interior support structure 12.

The fixation rods 64 are, for example, threaded rods that are received in complementary apertures, not represented, on the support structure to which each is fitted by means of automatic hooking and fixation, such that the clamp systems or all other equivalent systems, function in a manner that permits the mounting and fixation according to the direction D without having to subsequently intervene, that is to say, without having to intervene from the interior of the vehicle in order to assure the definitive fixation, this fixation being obtained according to direction D, in an "automatic" manner while one is mounting the module 44 in place in the housing 26.

The upper part in the shape of a rigid beam 60 of the plate can carry, on its upper face, a locking mechanism 66 which is designed to cooperate with the complementary hooking means carried on the lower edge of the rear window while it is mounted articulated onto the hatchback, in a manner to retain its closed position.

The support plate of the equipment module 44 comprises another lower part 68 in bent sheet metal which extends horizontally under the upper part 60 to which it is attached via shock absorbers 70 which are, for example, housed under the lugs 62.

Figure 5:
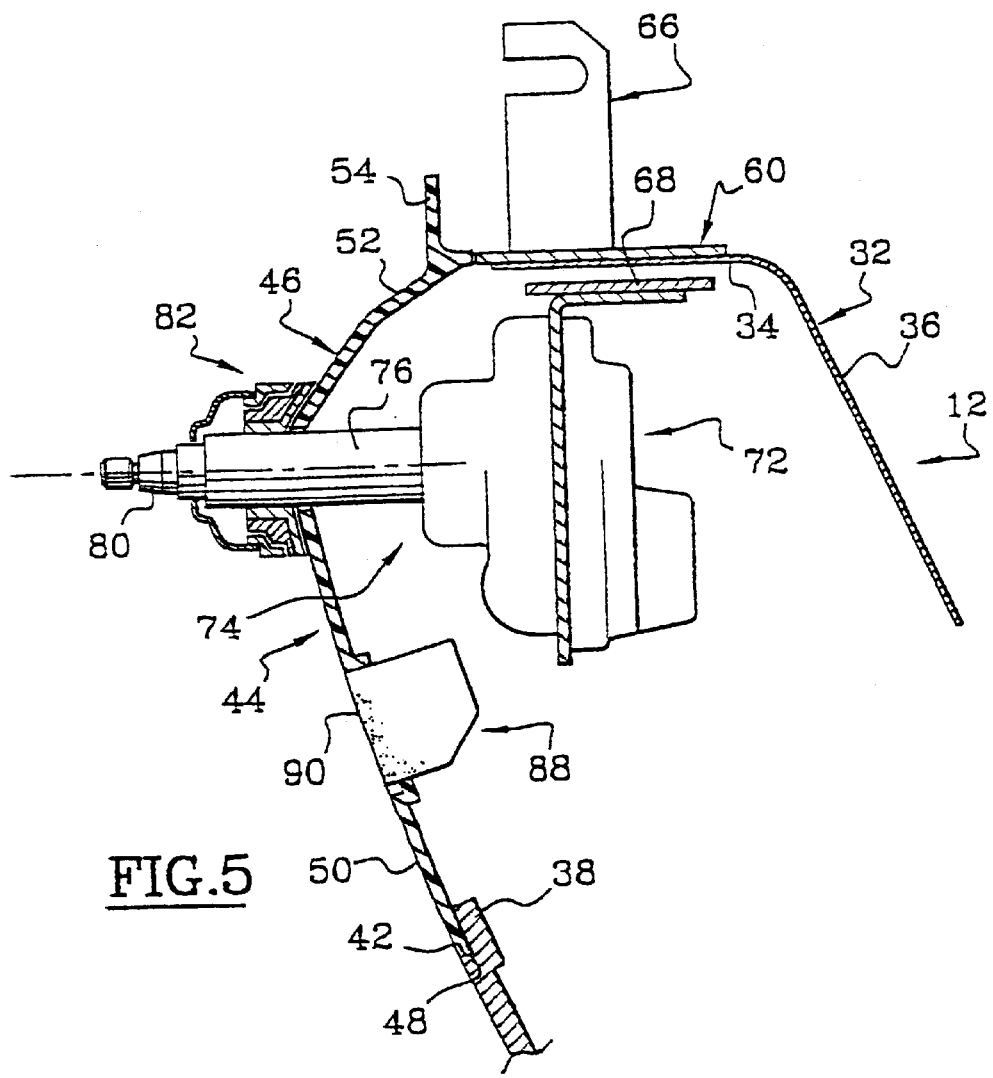
FIGS. 5 and 6 are cross section views, via vertical longitudinal planes, according to the lines 5—5 and 6—6 of FIG. 4, on which the equipment module is represented in mounted position.
Figure 6:
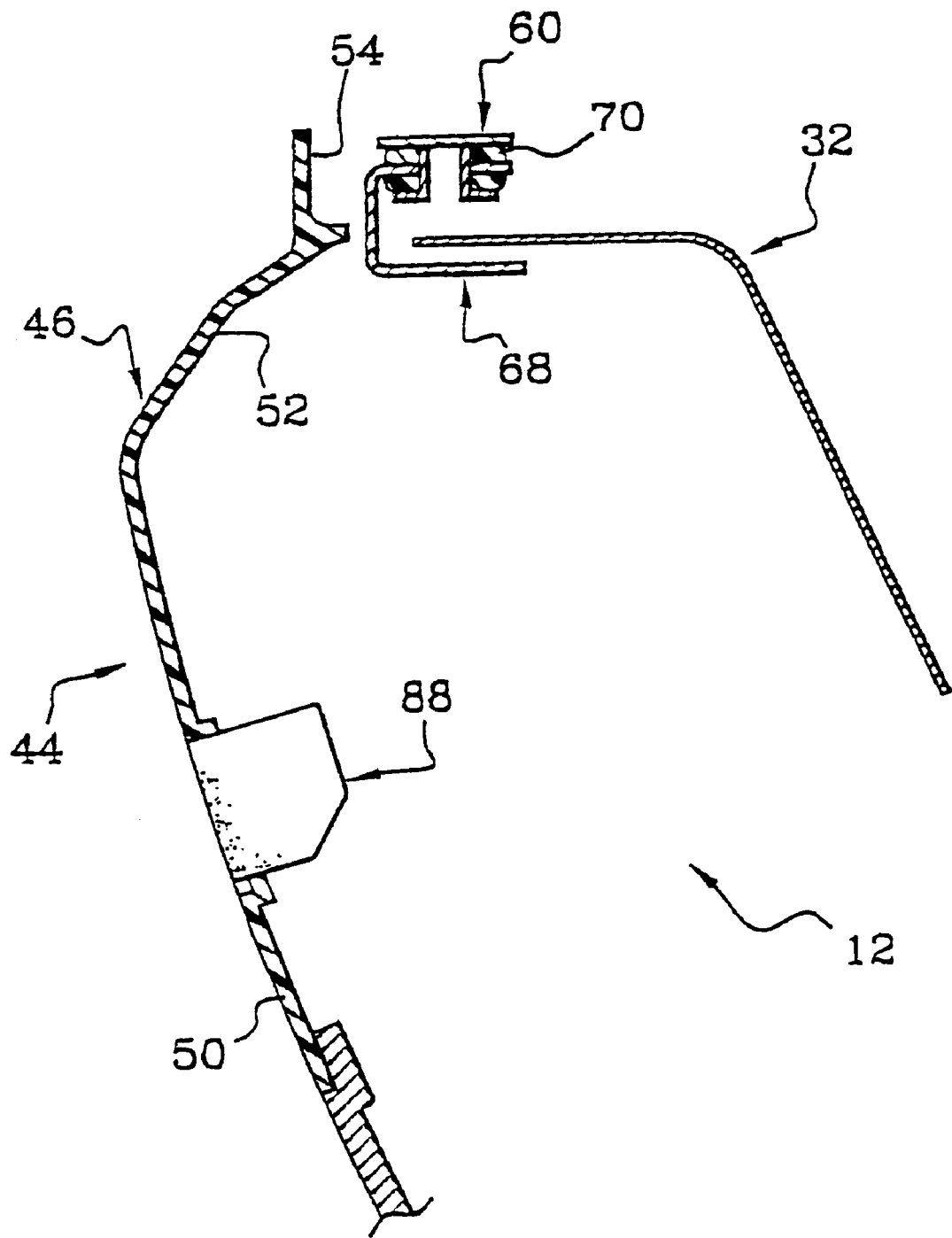

As one can specifically see in FIGS. 2 and 5, the lower part 68 of the plate serves to support the reduction motor 72 of a wiper system 74 of the rear window of which the exit shaft 76, that is to say the drive shaft of a wiper arm 78, projecting longitudinally towards the rear through the corresponding parts of the external body 46, at the linking level between the plates 50 and 52 of the body.

The free rear end 80 of the drive shaft 16 receives, in a known manner, an end of the wiper arm 78 in order to guide it in alternating wiping motion.

The means of guiding in rotation, sealing and fitting 82 are carried by the module 44, which is to say, by the external body 46.

In association with the wiper arm 78 which carries a wiper blade 84, the external body molded in plastic material 46 also carries, on the exterior face of its plate 50, a ramp forming element 86 of general known conception, which allows positioning of the wiper arm 78 in its resting position without the wiping scraper carried by the blade 84 being pushed against the surface of the vehicle, that is to say, against a surface of the equipment module 44.

The ramp 86 can be directly attached onto the body 46, partially embedded in it, or created from a material via molding with the body 46.

The equipment module 44 includes other components.

In the example illustrated in FIGS. 1 to 6, the equipment module 44 comprises a brake warning signal 88, also called a brake light, which here includes a transparent colored window 90 which is integrated into the lower part of the plate 50 of the external body 46.

The brake light also comprises lighting means not represented in detail.

The module 44 also comprises electric circuit elements, not represented on the figures, in order to join its different components and equipment as well as the connection means or electric linking of the module to the hatchback.

According to a production example, not shown, these electric circuit elements can comprise metal conductive bands embedded in the body molded in an insulating plastic material 46 of the equipment module 44.

Figure 7:
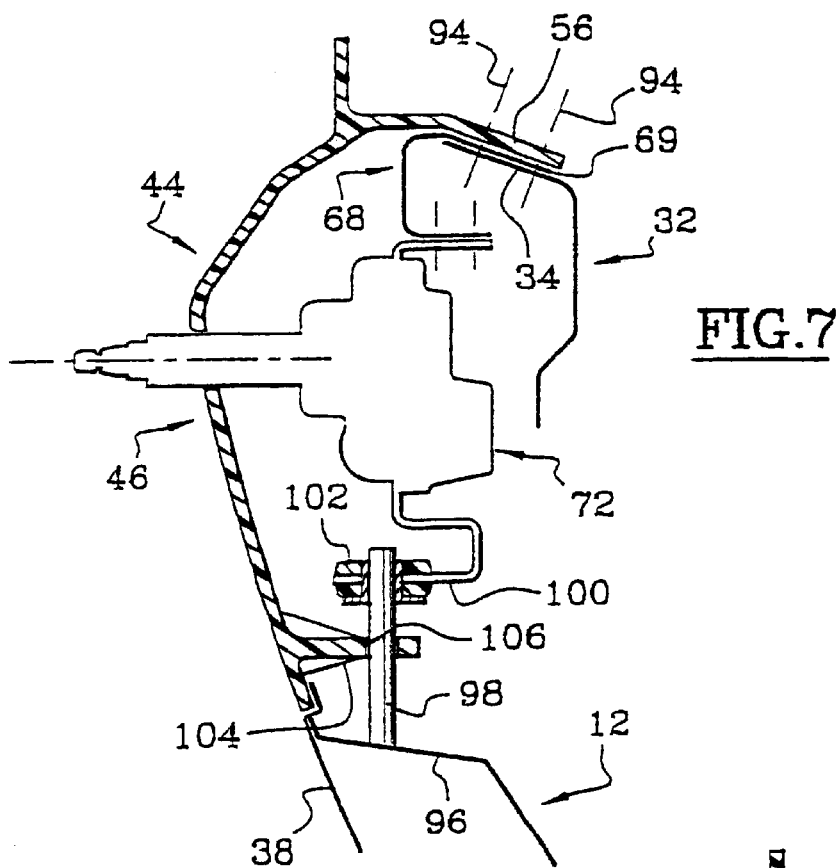
FIGS. 7 and 8 are similar views to those in FIGS. 5 and 6 that represent the production variances of the mounting and fixation means of the equipment module in a mounted position.
Figure 8:
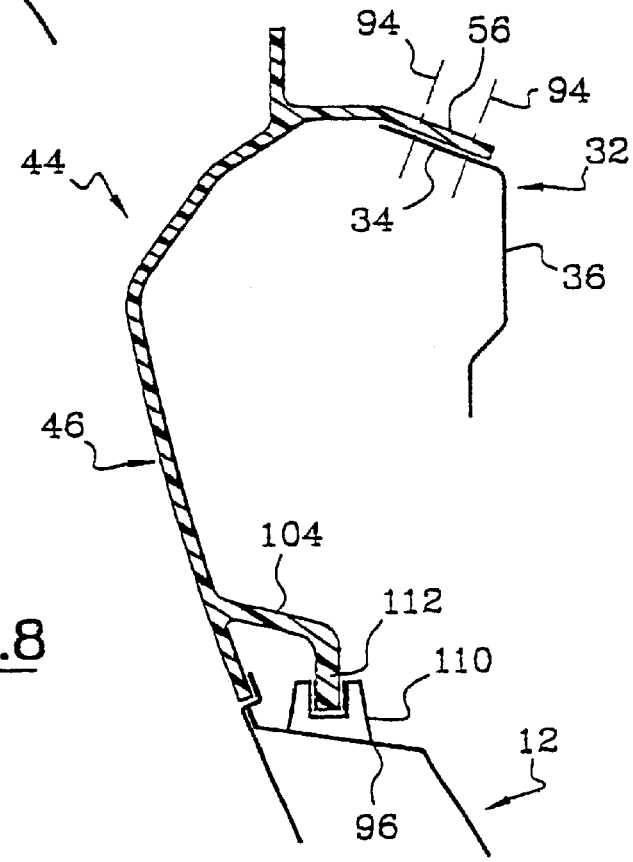

In the production variances illustrated in FIGS. 7 and 8, one has represented the means of perfection for the mounting and fixation of the equipment module 44 onto the rear hatchback 10 in order to particularly avoid attempted breakins via wrenching of the module 44 from the exterior of the vehicle.

To this effect, as one can see on the upper part of FIGS. 7 and 8, one can shape the upper plate 56 so that it extends above the upper flank 34 of the reinforcement transverse angle-section 32 to join together these two elements, with the eventual interposition of a flank 69 corresponding to the part 68 of the plate (see FIG. 7), via linking and fixation means, for example, the screw-nut type, which are not represented in detail but the fixation axis 94 of which are schematically represented in the figures.

In order to further increase resistance to wrenching, it is possible to shape the interior support structure 12 with a lower horizontal flank 96 which carries, for example, as one can see in FIG. 7, a vertical fixation rod which extends through a horizontal flank 100 of the reduction motor 72, with the interposition of an absorber. The rod 98 also extends through a hole 106 formed in an internal horizontal flank 104 of the external body 46 molded in a plastic material of the equipment module 44.

The mounting from the exterior of the module 44 always takes place according to the direction D previously mentioned and, once put in place, there is a vertical mounting course from top to bottom allowing the introduction of the rod 98 in the absorber 102 and the hole 106.

The anti-wrenching hooking means of the module can also be made up as one sees in FIG. 8, as a variance or complementing the rod 98, via a gutter 110 carried by the flank 96 in which is received the lower edge of a vertical flank 112 which prolongs vertically towards the bottom internal horizontal flank 104, the mounting being similar to that previously described.

Figure 9:
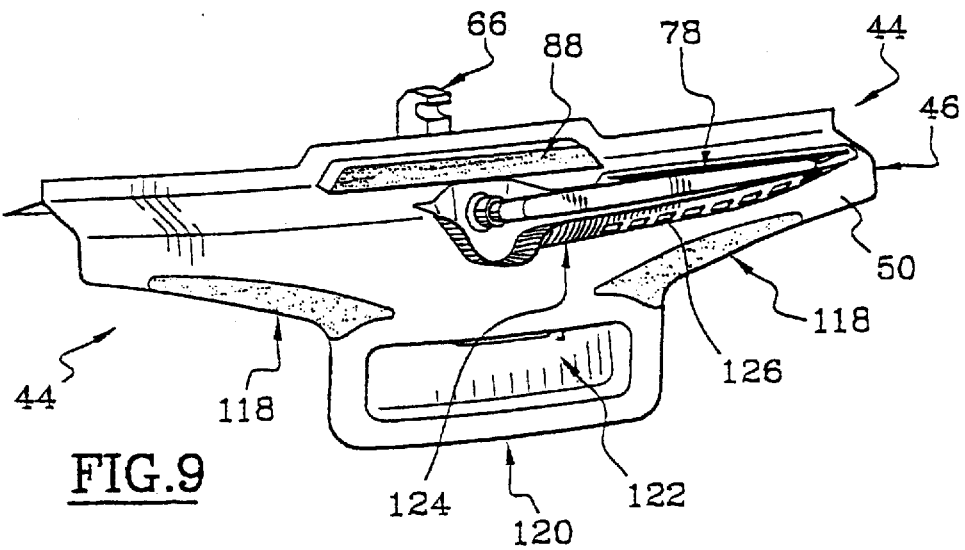
FIG. 9 is a perspective schematic view that illustrates a first production variance of the equipment module.

In the production variant represented in FIG. 9, the wiping module 44 comprises two signal lights equipped in the lower part 120 of the plate 50 which defines a housing 122 for a license plate.

The brake light 88 is partially higher than the module 44 while the two lower lateral lights 118 are, for example, flashing lights or the blinkers themselves. Produced from a material from molding with the body 46, one has also represented in FIG. 9 a profiled part 124 extending longitudinally towards the rear that make up a protection gutter of the wiper arm 78, particularly in order to resist wrenching during washing in automatic carwashes, the gutter 124 includes inlets 126 for water removal.

This gutter 124 can also be shaped in order to make up a maneuvering handle for the hatchback.

Figure 10:
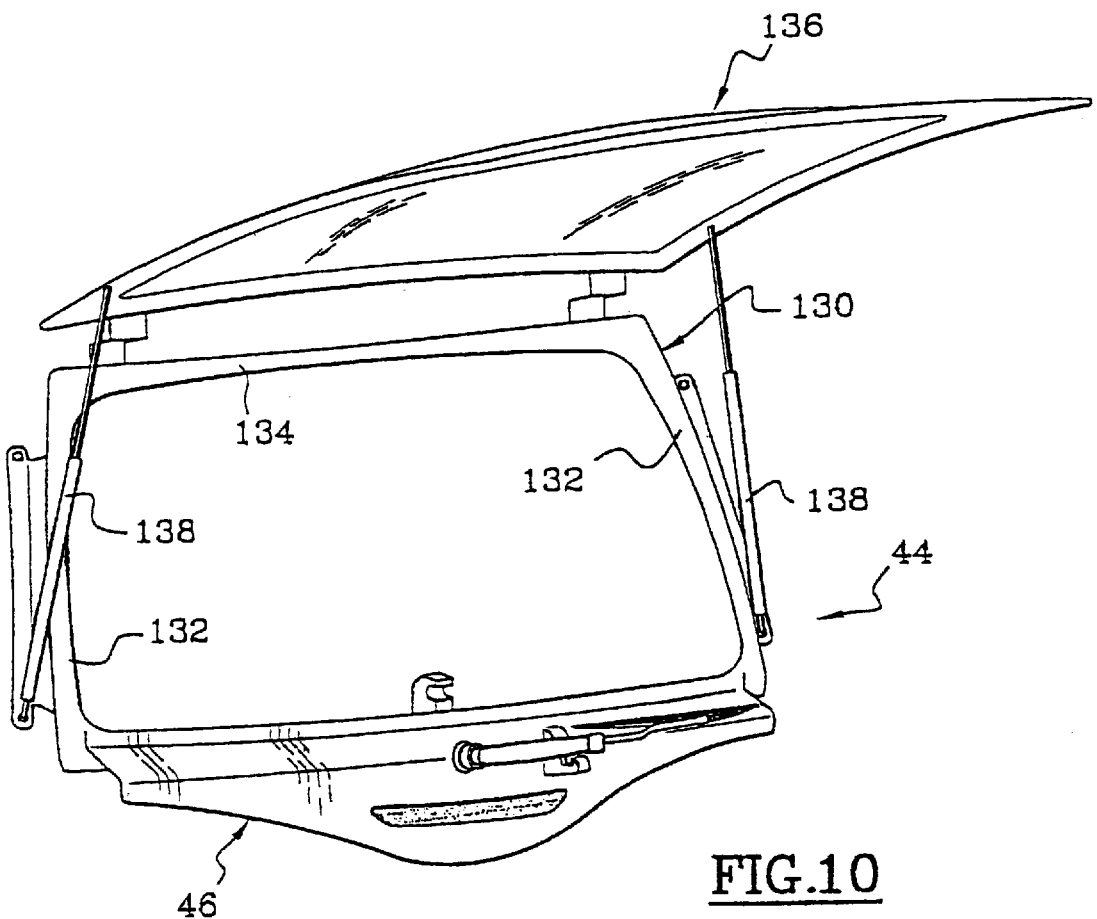
FIG. 10 is a view similar to that of FIG. 9 that illustrates a second production variance of the equipment module comprising a rear window articulated on the equipment module.

Finally, in a variant represented in FIG. 10, the module 44 integrates in its upper part a frame 30, which is, for example, created from a material via molding with the external interior body 46 which is made of up two vertical jambs 132 and by one horizontal upper jamb 134 on which a window 126 is mounted articulated by means of balancing devices 138.

According to this conception, it is thus possible to create the module unit 44 and to assemble the window 136 articulated outside of the hatchback then to come in and mount this equipment module unit 44 onto the hatchback 10, always from the exterior.

What is claimed is:

1. A motor vehicle rear transverse part of the type including a generally vertically oriented element defining a frame closed by a rear window, and including an internal support structure and an external fitting panel, an equipment module directly mounted on the element, and a wiper system, coupled to the equipment module characterized in that the equipment module is received in a housing at least partially defined by an opening in the element, wherein the equipment module is mounted from the outside of the element.

2. The motor vehicle rear transverse part according to claim 1, characterized by the equipment module including an external body of profile and shape complementary to the housing which receives it and which, in a mounted position, makes up a part directly attached to the exterior fitting panel.

3. The motor vehicle rear transverse part according to claim 2, characterized by the external body of the equipment module being a molded plastic material piece.

4. The motor vehicle rear transverse part according to claim 2, characterized by the external body of the equipment module carrying the fixation elements of the equipment module including fixation rods which extend parallel to the direction of the mounting of the equipment module.

5. The motor vehicle rear transverse part according to claim 2, characterized by the equipment module including an internal plate.

6. The motor vehicle rear transverse part according to claim 5, characterized by the internal plate comprising two parts joined together via elastic absorption means, of which a first part carries equipment and of which a second part is linked to the external body of the equipment module.

7. The motor vehicle rear transverse part according to claim 6, characterized by the second part of the plate including means for attaching the equipment module onto the element.

8. The motor vehicle rear transverse part according to claim 6, characterized by the second part of the plate carrying at least one piece of equipment, designed to cooperate with a mobile opening mounted in relation to the element.

9. The motor vehicle rear transverse part according to claim 6, characterized by the second part of the plate being a beam with a generally transverse and horizontal orientation.

10. The motor vehicle rear transverse part according to claim 6, characterized by the first part of the plate carrying a wiping system.

11. The motor vehicle rear transverse part according to claim 1, characterized by the equipment module being attached below the frame of the window.

12. The motor vehicle rear transverse part according to claim 1, characterized by the equipment module including a rear window.

13. The motor vehicle rear transverse part according to claim 12, characterized by the equipment module including a frame closed by the rear window.

14. The motor vehicle rear transverse part according to claim 13, characterized by the rear window being articulatingly mounted onto the equipment module.

15. The motor vehicle rear transverse part according to claim 1, characterized by the equipment module comprising at least a rear light formed of one of brake lights, turn signals, reverse lights, fog lights, and a license plate light.

16. The motor vehicle rear transverse part according to claim 1, characterized by the equipment module comprising at least one lighting device for one of the interior of the vehicle and the trunk.

17. The motor vehicle rear transverse part according to claim 1, characterized by the equipment module comprising means for positioning in a resting position a wiper arm of the wiper system.

18. The motor vehicle rear transverse part according to claim 1, characterized by the equipment module comprising means for protection, in a resting position, for a wiper arm of a wiper system.

19. The motor vehicle rear transverse part according to claim 1, characterized by the equipment module comprising means forming a handle.

20. The motor vehicle rear transverse part according to claim 17, characterized by the equipment module comprising means for positioning a wiper arm in a resting position, means for protection of the wiper arm in the resting position, and means for forming the handle, at least one of the means for positioning, means for protection, and means for forming the handle being produced from a material via molding with the external body of the equipment module.

21. The motor vehicle rear transverse part according to claim 1, characterized by the equipment module comprising control means, from the interior of the vehicle, for the opening of the element while the element is a vehicle door.

22. The motor vehicle rear transverse part according to claim 1, characterized by reinforcement means, forming part of the fixation of the equipment module onto the element, for increasing resistance to removal of the equipment module from the exterior of the vehicle.

23. The motor vehicle rear transverse part according to claim 1, characterized by the equipment module being mounted in the element perpendicular to a generally vertical plane of the element.

24. The motor vehicle rear transverse part according to claim 1, characterized by the element being a closure for an opening of a vehicle, articulatingly mounted on the body around an upper transverse axis of the vehicle.

* * * * *